(12) United States Patent
Linden et al.

(10) Patent No.: US 11,627,213 B2
(45) Date of Patent: Apr. 11, 2023

(54) FOLDABLE PHONE SUPPORT AND ADVERTISING METHOD

(71) Applicants: Gerald E Linden, Orlando, FL (US); Boaz Barry Groman, Boca Raton, FL (US)

(72) Inventors: Gerald E Linden, Orlando, FL (US); Boaz Barry Groman, Boca Raton, FL (US)

( * ) Notice: Subject to any disclaimer, the term of this patent is extended or adjusted under 35 U.S.C. 154(b) by 232 days.

(21) Appl. No.: 17/093,613

(22) Filed: Nov. 9, 2020

(65) Prior Publication Data

US 2022/0150341 A1    May 12, 2022

(51) Int. Cl.
    H04M 1/04      (2006.01)
    B65D 81/36     (2006.01)
    F16M 11/20     (2006.01)

(52) U.S. Cl.
    CPC ............ H04M 1/04 (2013.01); B65D 81/368 (2013.01); F16M 11/20 (2013.01)

(58) Field of Classification Search
    CPC ........ H04M 1/04; F16M 11/20; B65D 14/224
    See application file for complete search history.

(56) References Cited

U.S. PATENT DOCUMENTS

| D664,528 S | 7/2012 | Chen et al. |
|---|---|---|
| D771,615 S | 11/2016 | Pignotti |
| 2010/0213331 A1* | 8/2010 | Liou ................... F16M 11/2021 248/176.3 |
| 2014/0357328 A1 | 12/2014 | Aharon et al. |
| 2017/0223161 A1* | 8/2017 | Lau ......................... F16M 11/10 |
| 2017/0292647 A1* | 10/2017 | Loudon .................. F16M 11/38 |
| 2018/0239396 A1* | 8/2018 | Lu .......................... G06F 1/1632 |
| 2020/0130605 A1* | 4/2020 | Macneil ................ F16M 11/041 |

OTHER PUBLICATIONS

Make 4 Different Styles of Mobile Phone Stand Using Cardboard—How to Make Mobile Phone Stands https://www.youtube.com/watch?v=eFnLHOCW03o.
8 Smartphone Stands for Home, Office or Travel https://joyofandroid.com/best-smartphone-stands/.

* cited by examiner

*Primary Examiner* — Thanh C Le
(74) *Attorney, Agent, or Firm* — Gerald E Linden (57) ABSTRACT

A foldable phone support is provided as a flat sheet of card stock and is marked or perforated with a template which is removed from the flat sheet then folded into a 3-dimensional structure having a horizontally-extending base portion and a vertically-extending back portion. The base portion has two arms (wings), and features may be provided on the top edges of the base portion to inhibit or prevent the phone from sliding off of the support. Three-sided and four-sided supports are disclosed.

20 Claims, 5 Drawing Sheets

FIG. 1
four-sided support

FIG. 2
three-sided support

FIG. 3A
top edge of side panel(s) straight

FIG. 3B
top edge of side panel straight, angled

FIG. 3C
slits in the end flaps

FIG. 4
detail of a typical side panel

FIG. 5A
three-sided

FIG. 5B
four-sided

FOLDABLE PHONE SUPPORT AND ADVERTISING METHOD

CROSS-REFERENCE TO RELATED APPLICATION(S)

This application claims filing date benefit from U.S. 62/932,512 filed 8 Nov. 2019, incorporated in its entirety by reference herein.

BACKGROUND

Phone supports (or stands) of various types are known for supporting a phone in an upright position, allowing the user to engage in hands-free calls, particularly video calls. The supports are typically made of rigid plastic, and their manufacturing cost is non-trivial. The supports are often provided in 3-dimensional form, which involves further cost for packaging and shipping.
Some Prior Patents
US D771615S1—Phone stand
US D664528S1—Mobile phone stand
US 20140357328A1—Kick It Phone Stand

SUMMARY

It is an object of the invention to provide a support (or stand) for a cell phone which is very inexpensive to manufacture, and which can be shipped in a flat (versus 3-dimensional) form.

It is a further object to provide a phone support with a number of flat surfaces which can be imprinted with information, such as advertising information, or decorative graphics.

The phone support is readily manufactured from a sheet of card stock, or plastic, such as by die cutting, which involves minimal set-up and tooling cost. Generally, card stock may be preferred.

The phone support disclosed herein can be given away as a convenience to customers, such as at a restaurant, or it can be included or integrated with another item (such as a box of breakfast cereal) as a premium, or "bonus" item.

Provided as a flat piece of card stock (or plastic), the phone support can be folded into a 3-dimensional structure having at least two sides extending upward from a generally horizontal base portion and having a generally vertical back portion extending upward from a back of the base portion. The base portion extends as two arms, horizontally outward from the back portion, and their distal ends may be joined with one another with tabs, slots and the like to form a stable structure.

In its simplest form, the back portion may be formed by two panels extending upward from proximal portions of the respective two arms of the base portion, forming a support having a triangular (3-sided) form. Alternatively, an additional panel may extend upward from the base portion, between the proximal portions of the two arms of the base portion, forming a support having a generally rectangular (4-sided) form. The three-sided version may be preferred.

The base portion is adapted to support a phone in an upright position, typically slightly inclined, with the bottom of the phone supported by a top edge of the base portion and the top of the phone resting against the back portion. The angle of the phone can readily be changed by the user, by moving the bottom of the phone along the top edge of the base portion either closer to or further away from the back portion. The phone can be supported on the phone support either in a vertical ("portrait") or a horizontal ("landscape") position.

The phone support may be shipped, stocked, and provided to a user in a planar (flat) form, to be assembled by the user simply by folding (and connecting the tabs on the arms of the base portion). Moreover, the support may be removed by the user from an overall larger, rectangular (e.g.) sheet which has either lines printed on it for cutting out the form of the support, or lines of perforations which allow the user to tear the form of the support from the sheet. The sheet may be rectangular, such as letter size (8½×11 inches), and may be provide to the user as a table mat, or a panel of a cereal box, or the like.

After being used, the phone support can be unfolded back into its flat form for easy storage, or disposal. The material (cardboard or plastic) of the phone support may be eco-friendly.

Other objects, features and advantages of the phone support disclosed herein may be ascertained from the following descriptions of various embodiments thereof.

BRIEF DESCRIPTION OF THE DRAWINGS

Reference will be made in detail to embodiments of the disclosure, non-limiting examples of which may be illustrated in the accompanying drawing figures (FIGs). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

DETAILED DESCRIPTION

A flat piece of plastic or cardboard has a specific form (outline), and may be referred to as a "template" (or "sheet", or "substrate"). The template includes various surfaces and edges, and features such as fold lines, notches and tabs.

When assembled (folded), a support for a cell-phone is provided having a base portion and a back portion extending up from the base portion.

Two versions are disclosed herein:
a four-sided ("rectangular") version
a three-sided ("triangular") version
Both versions have:
a base portion extending horizontally from a back of the support to the front thereof
a back portion extending vertically upward from the back of the support
The base portion comprises:
two horizontally-oriented side panels (or arms, or wings) extending outward (typically forward, towards the user) from the back of the support and having (i) lower edges for resting on a surface (such as a table) and (ii) upper edges for supporting the phone resting on the support.

The overall support may have a height of a few inches (2"-4"; 5-10 cm).

The base portion may have a height of a few centimeters (2-4 cm). This will create a small "chamber" at the bottom of the support which may amplify sound coming from the bottom of the phone (assuming that the phone's speaker is disposed at the bottom of the phone).

The phone may be supported in an upright (portrait) orientation, or a sideways (landscape) orientation on the upper edges of the base arms (side panels) and, in either case, the phone may be leaned (angled) slightly backwards against the back portion of the support. The bottom (or side) of the phone which is supported on the upper edges of the support arms may be positioned closer to or farther away from the back portion to adjust the angle of the phone.

Since the phone may be angled (not quite vertical), it may tend to slide off of the front (distal end) of the base portion. This (sliding) can be inhibited by the top edges of the base arms being angled slightly downward from their distal ends (away from the back portion) to their proximal ends (where they meet/join with the back portion). The angle may be a few (1-10) degrees. This (sliding) can be prevented (prohibited) by providing "bump" (curb) features extending upward from the top edges of the base arms at or near their distal ends.

The back portion may have forward-oriented edges that are vertical. Alternatively, the forward-oriented edges of the back portion may be nearly vertical, or angled, from where the back portion joins with the base portion, backwards, towards the top of the back portion. The angle may be a few (1-10) degrees.

Four-Sided (Rectangular)

In this configuration, the base portion has:
a left side panel (or arm),
a "flap" extension at the distal end of the left side portion, and
a right side panel (or arm), a "flap" extension at the distal end of the right side portion which, when folded and assembled, may be joined to the flap extension of the left side portion to form a front panel of the base portion. A back portion of the base portion may be contiguous with the upwardly-extending back portion of the support.

Top edges of the side portions (arms) support the weight of the phone, which rests at an angle against the vertical back portion.

The top edges of the side portions (or arms) may be "wavy" to "capture" the lower edge of the phone, allowing it to be supported at various angles, and preventing it from sliding down when it is resting against the back portion.

The template may very easily be assembled (fold, connect free ends) by an end-user.

The resulting cell-phone support has ample flat surfaces for graphics (advertising), and is very inexpensive to produce.

The support may be provided to the end-user either as a flat template, or already assembled.

The support may be included with corporate give-aways (pens, etc.).

The support may be cut from a sheet of plastic, and may be provided to the end-user either as a flat template, or already assembled.

The template may be provided as a flat sheet of cardboard (or card stock), die-cut so that the end user can separate the template from the sheet, then assemble it. A flat, unassembled template may, for example, be provided as a "premium" item on a panel (such as the back panel) of cereal boxes, and the like. The template may be printed or pre-punched on the box panel.

A "regular" size template may be used to form a support for a cell-phone.

A "large" size template may be used to form a support for a tablet.

A support structure for a cell-phone may comprise:
a flat substrate (such as plastic or cardboard), has a specific form (outline), and may be provided with fold lines (or welts, or the like), notches and tabs, and some other features (refer to illustrations);
the substrate (or "template") may assembled (folded) by an end-user to form a 3-dimensional support structure from the flat template.

Graphics (such as advertising, team logos, etc.) may be provided on surfaces of the template (and resulting support structure).

The left and right ends (end flaps extending from respective left and right side panels) may form the front of a base for the support, and may be overlapping and/or connected with one another in any suitable manner, such as the illustrated tab/notch (FIG. 1) or, in the case of cardboard, the overlapping ends may be stapled to one another. Another alternative is one flap has a slit extending from its top edge, the other flap has a slit extending from its bottom edge, and the flaps are overlapped, inserted into each others' slits.

Some Embodiments

Figure 1:
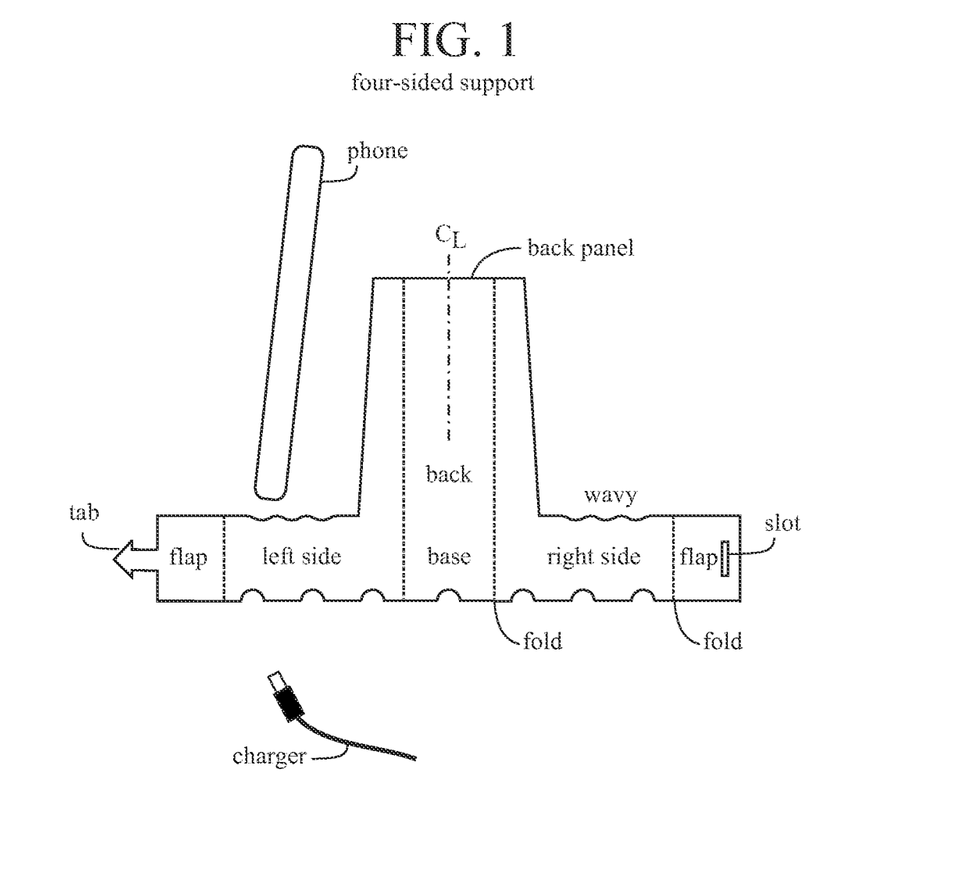
FIG. 1 is a diagram (plan view) of a template of a four-sided support, according to an embodiment of the invention. This diagram also illustrates one way that flaps may be provided at the distal (front) ends of the side panels (arms, wings), and the flaps may have tabs and slots to connect with each other. The top edges of the side panels are wavy. Notches may be formed in the bottom edges of the side panels.

FIG. 1 is a diagram (plan view) illustrating a "four-sided" phone support, flat, not folded, according to an embodiment of the invention. Notice that the top edges of the side panels (arms, wings) may be "wavy", to allow the bottom edge of the phone to be securely positioned at various distances from the back of the support, thereby allowing "stepwise" adjustments to the angle of the phone as it is resting on the support.

This (wavy top edge) represents a feature on the top edges of the base portion. A similar feature is to have one or two bumps (or "stops") protruding upward to limit the forward position of the bottom of the phone with it is resting on the support. Another feature is that the top edges (when assembled) of the base portion may be angled downward from the front of the support to the back.

This diagram also illustrates one way that flaps may be provided at the distal (front) ends of the side panels (arms, wings), and the flaps may have tabs and slots to connect with each other. The top edges of the side panels are wavy.

Notches may be formed in the bottom edges of the side panels to allow, for example, a charger cable to be plugged into the bottom of the phone when it is resting on the support.

The base may be provided with a bottom surface (not shown), which can be formed by additional extension portions of the template (such as extensions of the side panels), forming a open-top "box" where ear buds and the like can be stored (when assembled). Alternatively, the base may be left open.

The base may be high (tall) enough to allow a charger cable to enter the structure (through the notches on the bottom edge), and connect to the phone. A right-angle USB connector (female to male) may be provided, to avoid kinking the charger wire. However, this would be antithetical to the object of "keeping it simple". Generally, a one piece foldable structure, as disclosed herein, may be preferred.

The base forms a "chamber" which may amplify sound coming from the phone's speaker. This may be true whether the base is closed, or open and sitting on a surface (table).

Ear buds and the like may be stored in the base.

The template may be formed with a strap extending across the base, or with other tabs or slots disposed along sides of the base, for accepting something like coins, to add weight to the assembled structure to add stability to the whole thing (support with phone sitting on it), thereby minimizing tipping over.

The template may be extremely inexpensive to produce (in some cases, requiring only modifying the dies for cutting the already existing cardboard), and may be flat (FIG. 1).

The support structure may be disassembled (unfolded) for easily carrying, such as in a book-bag, or portfolio, or briefcase. Or even in a user's pocket (such as a jacket pocket)

The support structure may be made available, in its flat un-assembled form (i.e., the "template") to customers of establishments such as McDonalds, or Starbucks, where they may want to relax, have something to eat or drink, and use their phone. The template could be defined by perforations in a standard rectangular flat sheet of material (e.g., card stock), and would, of course, be printed with advertising.

Some exemplary approximate dimensions may be as follows. The base portion may be 2-3 cm high. The width of the base portion (between the two side portions) may be 4-6 cm. The back portion may extend vertically 8-10 cm above the base portion. The back portion may have a width of 2-4 cm. The base portion may extend horizontally 4-6 cm from the back portion.

FIG. 1 shows a the flat "template" for the phone support, prior to folding (assembling). Various fold lines are shown, also a centerline (CL). A phone is shown, for reference (perspective). A charger cable is shown, for reference (perspective).

The template for the phone support may be delivered to the user as a flat, rectangular sheet with lines printed on the sheet, or lines of perforations punched into the sheet, to allow the user to separate the template from the overall sheet. The sheet may suitably be a "place mat" supplied by a restaurant to the user, containing advertising information, or a menu, etc.

Figure 2:
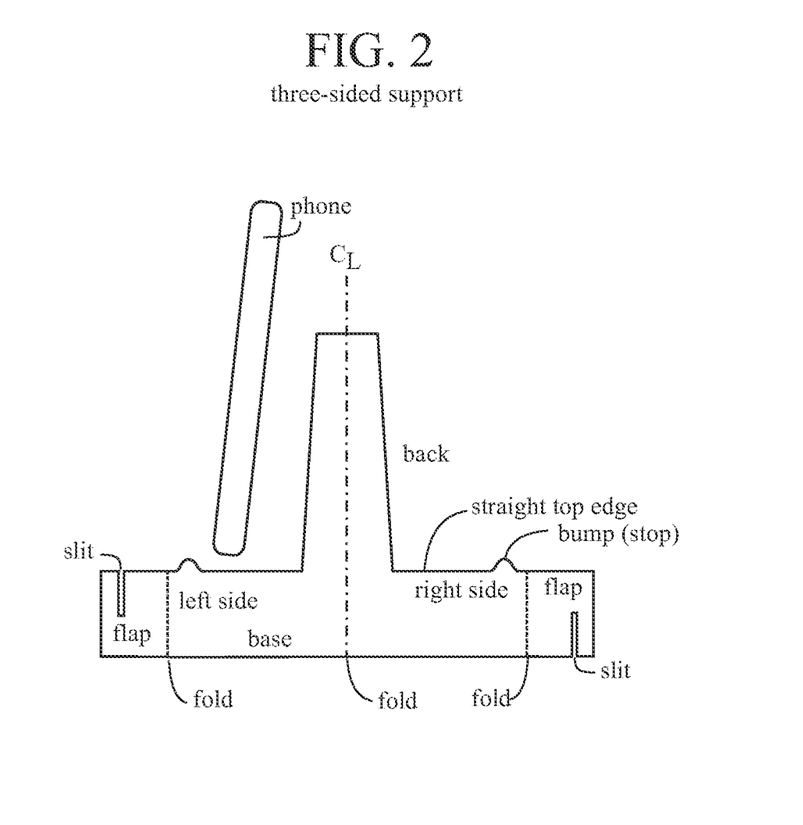
FIG. 2 is a diagram (plan view) of a template of a three-sided support. according to an embodiment of the invention. This is essentially the same as the four-sided embodiment (FIG. 1), but without the back panel. Rather, the two side panels are joined with each other, at the centerline, by their back edges, and the back of the support is formed by two panels extending upward from the back portions of the side panels.

FIG. 2 is a diagram (plan view) of a template of a three-sided support. according to an embodiment of the invention. This is essentially the same as the four-sided embodiment (FIG. 1), but without the back panel. Rather, the two side panels are joined with each other, at the centerline, by their back edges, and the back of the support is formed by two panels extending upward from the back portions of the side panels.

This embodiment illustrates slits in the flap extensions of the side panels for assembling the support, in the manner shown in FIG. 3C (below). This embodiment also shows bumps (stops) extending upward from near the front (distal) ends of the side panels.

Figure 3A:
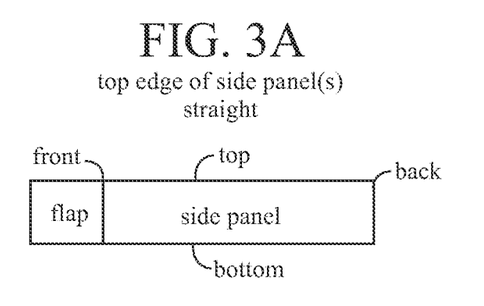
FIG. 3A is a diagram (plan view) of an exemplary one of two side panels (arms, wings) having a straight top edge.

FIG. 3A is a diagram (plan view) of an exemplary one of two side panels (arms, wings) having a straight top edge.

Figure 3B:
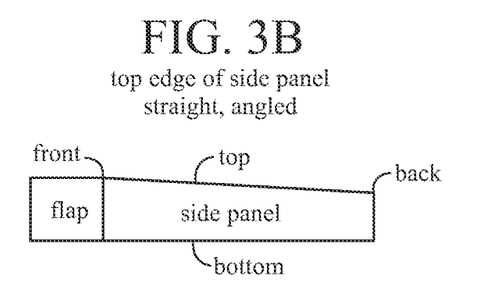
FIG. 3B is a diagram (plan view) of an exemplary one of two side panels (arms, wings) having a straight top edge which is angled from front (distal end) to back (proximal end).

FIG. 3B is a diagram (plan view) of an exemplary one of two side panels (arms, wings) having a straight top edge which is angled from front (distal end) to back (proximal end).

Figure 3C:
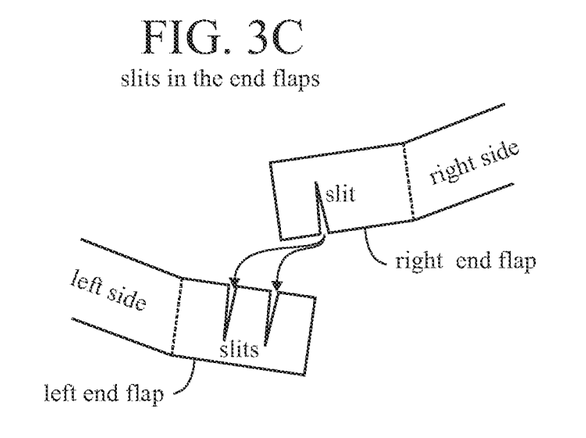
FIG. 3C is a diagram showing how one (right side) front flap may have a single slit extending in from its bottom edge, and the other (left side) front flap may have one or more slits extending in from its top edge. With two slits extending into the to edge of the left side front flap, the two flaps may be engaged in two different positions to make the base of the support wider or narrower.

FIG. 3C is a diagram showing how one (right side) front flap may have a single slit extending in from its bottom edge, and the other (left side) front flap may have one or more slits extending in from its top edge. With two slits extending into the to edge of the left side front flap, the two flaps may be engaged in two different positions to make the base of the support wider or narrower.

FIG. 3C shows that flaps at the distal (away from the back) ends of the left and right sides of the base may be provided with slits or the like to facilitate joining the sides together when assembling the flat template into a 3-dimensional phone support.

FIG. 3C shows that the left end flap (extension of the left side panel) is provided with two notches extending into the flap from its top edge, and the right end flap (extension of the right side panel) is provided with a single notch extending into the flap from its bottom. In this manner, the end flaps may be overlapped and joined together at two different positions to determine two different widths for the front of the support. e left and right end flaps may be provided with notches, such as illustrated in FIG. 1A, so that they may be connected.

Figure 4:
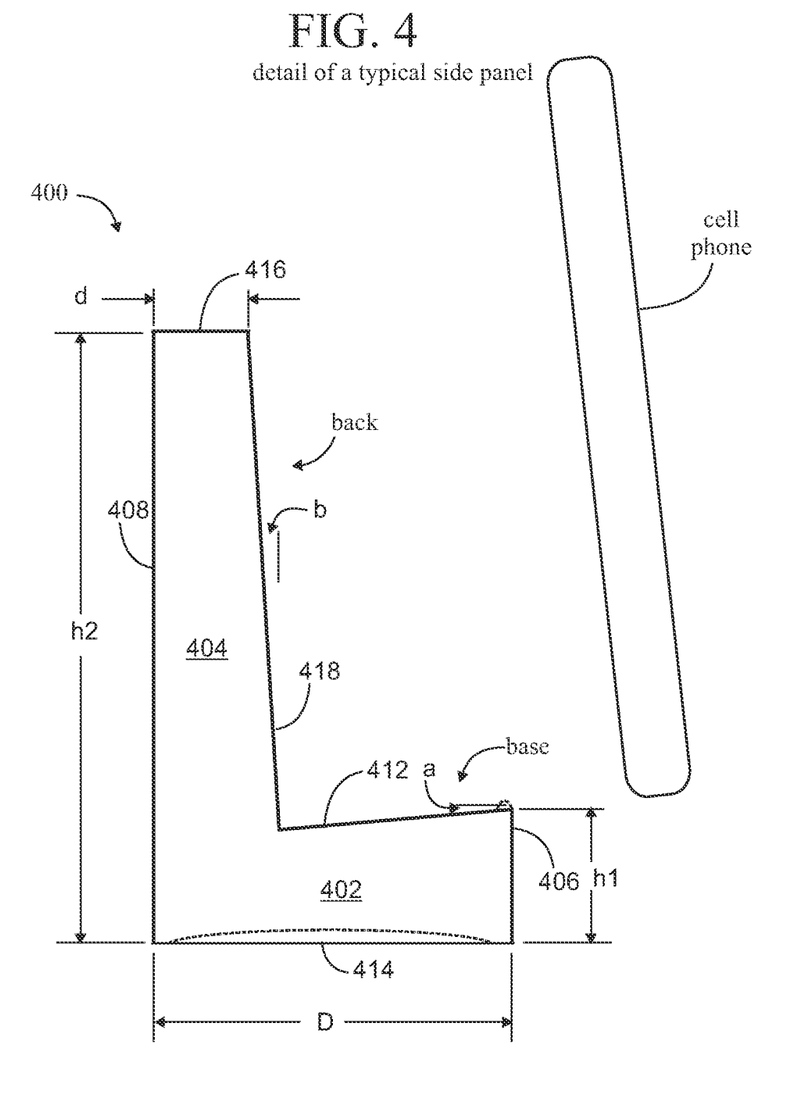
FIG. 4 is a diagram of a typical one of two (typically identical, mirror-images of each other) side panels for the phone support, and also shows a cell phone for being disposed on the top edges of the side panels. This side profile is generally applicable to either three-sided ("triangular") of four-sided ("rectangular") phone supports.

FIG. 4 is a diagram of a typical one of two (typically identical, mirror-images of each other) side panels for the phone support, and also shows a cell phone for being disposed on the top edges of the side panels. This side profile is generally applicable to either three-sided ("triangular") of four-sided ("rectangular") phone supports.

From the side, the support 400 is generally L-shaped, having a generally horizontal base portion formed by side panels (one shown) 402 and a generally vertical back portion 404. The flap extensions of the side portions The base portion may be considered to extend all the way from the front edge 406 of the support to the back edge 408 of the support, and may have a height "h1" at its front edge (distal from the back) and a height h2 at its back edge (or proximal to the back). The base portion may be slightly (such as a few millimeters) higher at the front than at the back so that its top edge 412 is slightly angled towards the back, such as with an angle "a" of a few degrees, to counteract a tendency for the phone to slide down and off of the support. Alternatively, the top edge of the base portion may be wavy, or it may have a "stop" (or "curb") disposed near its front edge and extending slightly (such as a few millimeters) upward to prevent the phone from sliding off. A phone support made from card stock will also exhibit some friction to prevent this from happening, whereas a phone support made from plastic may have much less friction.

A bottom edge 414 of the base portion may be flat, or it may be slightly (such as a few millimeters) "relieved" (dashed line) to ensure that the support can rest stable on a slightly uneven surface. Indeed, a triangular support may have substantially only three points of contact with the underlying surface. (A four-sided support would have four points of contact.)

The back edge 408 of the support may be substantially vertical. The overall height "h2" of the support may be approximately 10 cm, as measured from its bottom edge 414 to its top edge 416. The overall depth "D" (horizontal dimension, from back-to-front) of the support may be approximately 5 cm, as measured from the back edge 408 to the front edge 406. A width of the support, from the front distal edges of the two side panels (wings, arms) is not shown in this side view, but may be approximately 2-5 cm.

Front edges 418 of the (two) panels forming the back portion 404 may be slightly angled, from front-to-back, resulting in an angle "b" (such as a few degrees) from vertical. This is to ensure that the phone is resting securely against the back. Else, the phone may tend to tip forward, if disturbed. The back edges of the side panels would be joined with one another in a three-sided version (e.g., FIG. 2). The back edges of the side panels would be joined to edges of a back panel in a four-sided version (e.g., FIG. 1).

The back may or may not come to a point. In FIG. 4, it is shown that the top edge 416 of the back portion may have a depth "d", such as a few millimeters, from the top of its front edge 418 to the top of its back edge 408. Note that the front edge is tapered.

Figure 5A:
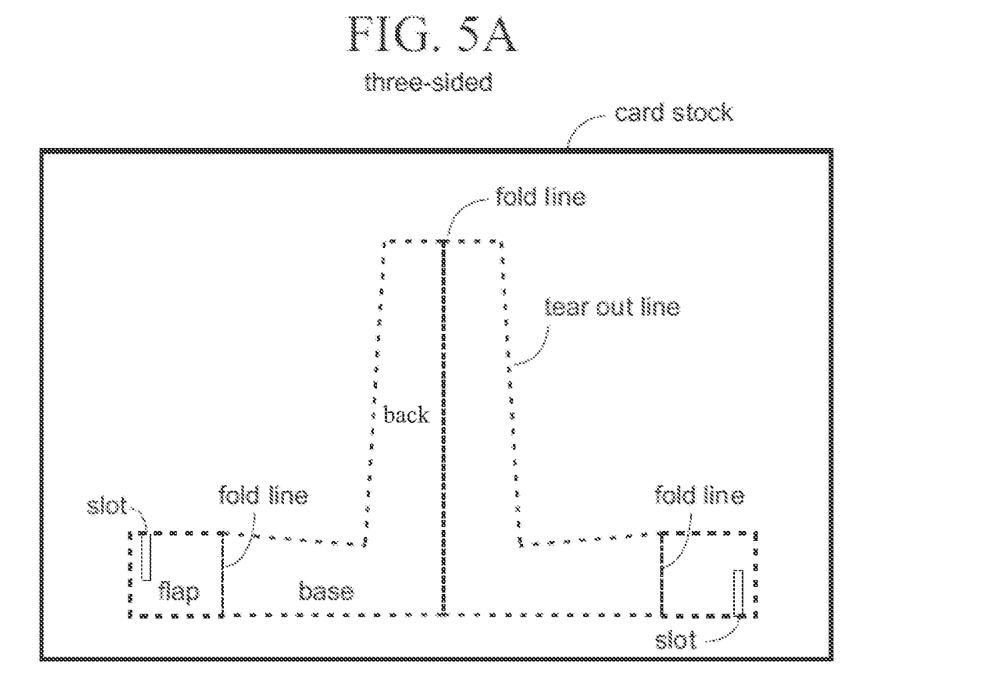
FIG. 5A shows a template for a three-sided ("triangular") phone support which is defined by tear-out lines (or lines of perforations) in a larger, typically rectangular piece of card stock, which may, for example, be a place mat. Rather than having perforations, the outline of the template may be printed, and the template may be cut out by the user (such as with scissors).

FIG. 5A shows a template for a three-sided ("triangular") phone support which is defined by tear-out lines (or lines of perforations) in a larger, typically rectangular piece of card stock, which may, for example, be a place mat. Rather than having perforations, the outline of the template may be printed, and the template may be cut out by the user (such as with scissors).

Figure 5B:
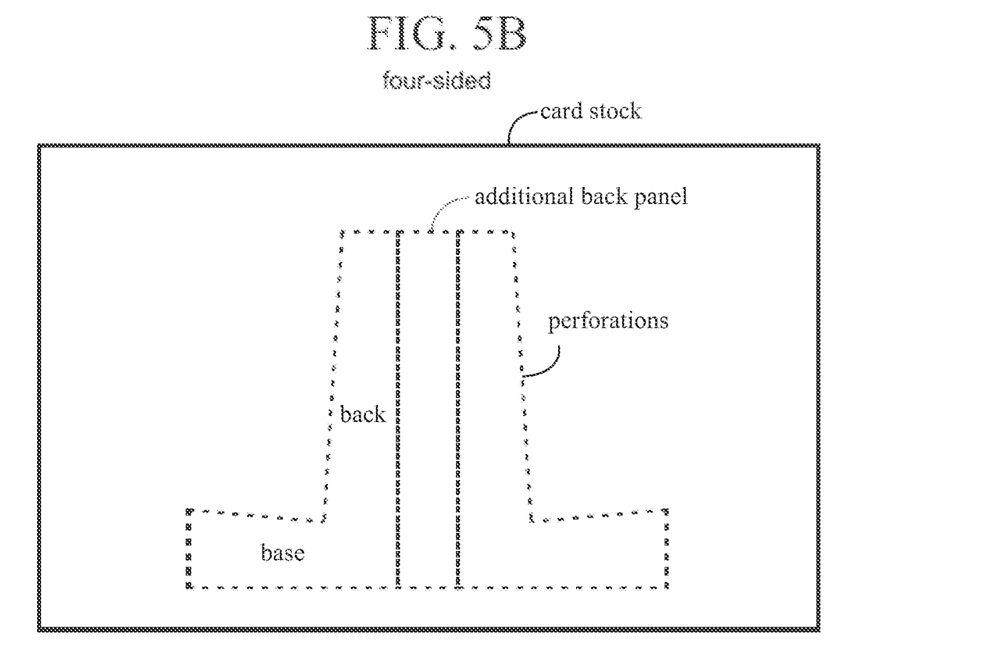
FIG. 5B shows a template for a four-sided ("rectangular") phone support which is defined by tear-out lines (or lines of perforations) in a larger, typically rectangular piece of card stock, which may, for example, be a place mat. Rather than having perforations, the outline of the template may be printed, and the template may be cut out by the user (such as with scissors).

FIG. 5B shows a template for a four-sided ("rectangular") phone support which is defined by tear-out lines (or lines of perforations) in a larger, typically rectangular piece of card stock, which may, for example, be a place mat. Rather than having perforations, the outline of the template may be printed, and the template may be cut out by the user (such as with scissors). Front end flaps for joining the distal ends of the two base sides (arms) together, are omitted, for illustrative clarity.

FIGS. 5A,B both show that the template for the phone support may be defined by lines of perforations (tear out lines) which are formed (or printed) in a larger piece (substrate) of card stock (for example) which may be how the support is supplied to the end-user. The larger substrate may, for example, be a place mat, or a panel of a cereal box, or simply a suitably sized rectangular piece of card stock provide to the user in any suitable format.

APPENDICES

Appendix A, incorporated by reference herein, has some photographs, illustrations and diagrams of phone supports made according to some embodiments of the invention. Descriptive text is included, as follows:

(A1) This shows a phone being supported in an upright (portrait orientation) position on a support. Note that the top edges of the panels forming the base portion have features (protrusions, bumps) extending upward to prevent the phone from sliding off of the support. Two of these features are provided to provide corresponding two secure positions (angles) for orienting the phone. The tendency of the phone to want to slide down and off of the support is particularly pronounced when the phone is in an upright (versus) sideway position.

(A2) This is a back view of a 4-sided (rectangular) phone support with a phone being disposed thereupon. Note that there is an upwardly-extending feature on front (distal) end of the base portion to keep the phone from sliding down, and off.

(A3) This is a view of a four-sided support similar to that shown in (A1). Here it can be seen that the forward edges of the sides of the back portion are angled. Also the two upwardly-protruding features on the top edges of the two arms of the base portion are evident. Recall, that an alternative to having these features is that the top edges of the base portion are angled slightly downward, from front-to-back, or the top edges are "wavy".

(A4) This shows a typical template for a four-sided support. Note the flaps at the ends of the side portions with slits that allow for them to be joined with one another.

(A5) This shows a template for a 3-sided ("triangular") support. Note the raised features at the front of the two sides, and the flaps with slots for joining the two sides.

(A6) This (photograph) shows a 3-sided support, assembled.

(A7) This (photograph) shows a 3-sided support, assembled, with a phone being supported upon it.

Appendix B, incorporated by reference herein, reprises FIGS. 2A,B,C,D and 3A,B,C of the provisional.

Relative dimensions, vis-à-vis an exemplary phone, may be ascertained from the views in FIGS. 2A-D of the provisional application.

FIGS. 2A,B,C,D are photographs of an early prototype of the invention, and shown supporting a phone in an upright (2C, portrait) or sideways (2D, landscape) orientation.

FIGS. 3A,B,C are photographs of an early prototype of the invention, and show placing a weight in the base of the phone support to add stability.

FIGS. 2A,B,C,D are photographs of a cardboard prototype, wherein the ends of the left and right sides are overlapping and stapled together (rather than the tab/slot arrangement shown in FIG. 1), and also showing that there may be notches (or openings) provided on the bottom of the base to allow a charger cable to be inserted into the phone while it is disposed on the support. See also FIG. 1 which shows a charger cable.

FIGS. 3A,B,C are some photographs of another, similar prototype. This one has a straight (rather than wavy) edge along the top surface of the base. It was found that with a small angle (such as) 5°, the phone will "stay put", without sliding. Also, the top edge of the base is angled upward, from the vertical back of the support to the front of the base. A phone is unlikely to slide off.

These pictures also show the strap extending across the bottom of the base, with coins taped thereto to add weight (lower the center of gravity), making the support more stable.

This illustrates that the base, which forms an open space (volume), may be used to store various objects, such as ear buds. The volume of the base may also improve the acoustics by resonating sound coming from the phone speaker, assuming that the phone is disposed in an upright (profile) position on the support, and the phone's speaker is at the bottom of the phone).

Appendix N1 shows some prior art techniques for making different styles of mobile phone stands using cardboard (corrugated). These techniques require much cutting, resulting in several different pieces, followed by assembly requiring gluing. In contrast thereto, the present invention provides a single piece of card stock (or plastic) which can be folded into a support (or stand) without requiring gluing.

Appendix N2 shows smartphone stands for home, office, or travel. They all appear to be plastic. Some (2. Omotron, 3. Ugeren, 5. Moko multi-angle, 6. HiTech wireless) appear to be foldable, to some extent, but do not appear to be capable of being folded flat. Some (1. Lamicall, 4. ToBeoneer) appear to be one piece, very 3-dimensional, and not collapsible at all. In contrast thereto, the present invention provides a single piece of card stock (or plastic) which can be folded into a support (or stand), and subsequently unfolded for storage or disposal.

Some Distinctions Between the Invention Disclosed Herein, and the Prior Art

Some prior art phone stands (supports) have an adjustable angle between their base and their back, presumably to enable the angle of the phone to be adjusted by the user. The support of the present invention has a fixed angle between the base and the back, and the user can adjust the angle of the phone by sliding the bottom (or side) of the phone, which is resting on the top edge(s) of the base, towards or away from the back. Both the top edges of the base and the front edges of the back may be angled slightly to facilitate this procedure.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. A phone support comprising:
a flat sheet of cardstock suitable to be assembled by folding into a 3-dimensional structure, wherein the assembled structure comprises:
two side panels, each having back edges, distal ends opposite the back edges, top edges and bottom edges, wherein the two side panels are joined with each other at their back edges;
a generally vertical back portion extending upward from the top edges of the side panels; and
flaps extending from the distal ends of the side panels, and capable of being connected with one another;
wherein, in use, top edges of the side panels support a phone.

2. A method of advertising, comprising:
providing a phone support structure as a flat template of card stock, wherein either (i) the card stock is in the form of the template, or (ii) the card stock is rectangular and has perforations defining the template so that a user can detach the template from the card stock, or (iii) the card stock is rectangular and has lines printed on it defining the template so that a user can cut the template from the card stock;
a user assembles the flat template into a 3-dimensional phone support structure, as described in claim 1.

3. The method of claim 2, wherein:
the flat, unassembled template is provided as a "premium" item on a panel of a box.

4. The method of claim 2, deployed in an eating establishment.

5. The method of claim 2, deployed in a retail establishment.

6. The method of claim 2, wherein the template is packed in a box.

7. The method of claim 6, wherein the box is a cereal box.

8. The method of claim 2, wherein the template is imprinted or perforated on a panel of a box.

9. The method of claim 8, wherein the box is a cereal box.

10. The phone support of claim 1, further comprising:
tabs, slots or slits disposed on the flaps.

11. The phone support of claim 1 wherein:
the flap of one side panel has a slit extending downward from a top edge thereof; and
the flap of the other side panel has a slit extending upward from a bottom edge thereof.

12. The phone support of claim 1 wherein:
the top edges of the side panels are straight.

13. The phone support of claim 1, wherein:
the top edges of the side panels are slightly higher at their distal ends and angled towards their back edges to counteract a tendency for the phone to slide down and off of the support.

14. The phone support of claim 1, wherein:
the top edges of the side panels are wavy.

15. The phone support of claim 1, wherein:
the top edges of the side panels include bumps extending upward from near their distal ends.

16. The phone support of claim 1, wherein:
forward-oriented edges of the back portion are angled backwards, towards a top of the back portion, to ensure that a phone supported on the top edges of the side panels is resting securely against the back of the support.

17. The phone support of claim 1, wherein:
when assembled, the side panels form a chamber which may amplify sound coming from a speaker of a phone resting on the top edges of the side panels.

18. The phone support of claim 1, further comprising:
notches formed in bottom edges of the side panels.

19. The phone support of claim 1, further comprising:
a back panel disposed between the two side panels.

20. The phone support of claim 1, wherein:
the support is defined by lines printed on or perforations in a sheet of card stock.

\* \* \* \* \*